March 3, 1970  H. EBERHARDT  3,498,491
CAP-SHAPED COVER AND A METHOD FOR PRODUCING A VACUUM
CLOSURE ON GLASS CONTAINERS
Filed Feb. 1, 1968
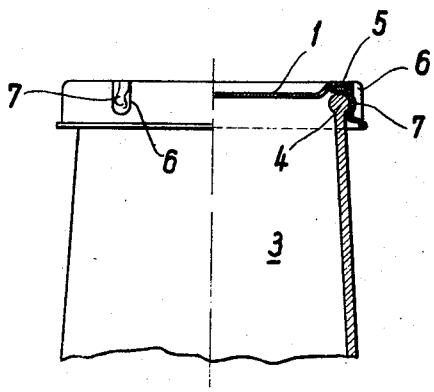
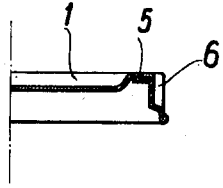
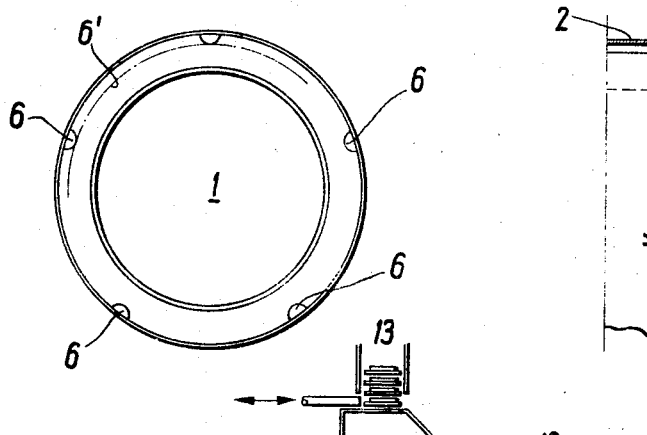
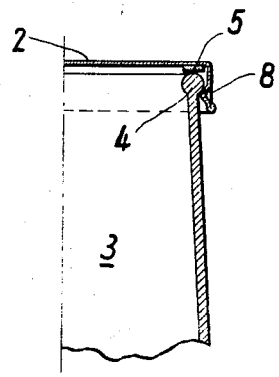
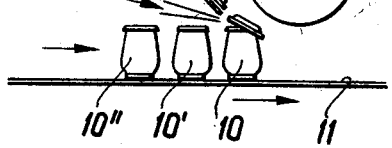
Inventor:
HEINRICH EBERHARDT

United States Patent Office 3,498,491
Patented Mar. 3, 1970

3,498,491
CAP-SHAPED COVER AND A METHOD FOR PRODUCING A VACUUM CLOSURE ON GLASS CONTAINERS
Heinrich Eberhardt, 9 Gasstrasse, 221 Itzehoe, Holstein, Germany
Filed Feb. 1, 1968, Ser. No. 702,467
Claims priority, application Germany, Feb. 6, 1967, E 33,343
Int. Cl. B65d 41/22
U.S. Cl. 215—41    2 Claims

ABSTRACT OF THE DISCLOSURE

A vacuum closure for a beaker-like container is provided by a cap-shaped cover having a plurality of inwardly directed resilient indentations formed in its side wall surface. The indentations are deflected outwardly in passing over a bead at the mouth of the container and their resilient structure cooperates with the bead in securing the cover on the mouth of the container.

---

The invention relates to a cap-shaped cover with a sealing insert and a flange defining the edge of the side wall of the cover, particularly useful for producing a vacuum closure for beaker-shaped containers having a small bead on the outside of their mouth edges, as for example glass beaker-shaped containers with unground mouth edges.

A very wide variety of designs of cap-shaped covers suitable for vacuum closures are already known. They are usually attached to the mouth of the container by deforming the whole side wall of the cover by means of a closure head. They are removed, after a vacuum has been produced, in the container by lifting the edge of the side wall of the cover with a coin or similar tool, or by rotating the cover manually in the case of a screw closure cover.

The invention relates to a novel cover of the type previously mentioned, the attachment of which requires no special closure head. The novel cover acts like a snap-on cover, and may be attached to the container initially with very little force; it may also be opened easily by hand. It is inexpensive to manufacture and is suitable for closing very large numbers of packages per unit of time.

According to the invention, the side wall of the cover has a number of indentations distributed around its periphery. An imaginary circle joining the inner surfaces of the indentations has a diameter smaller than the diameter of the outer periphery of the bead on the edge of the mouth of the container. The indentations are so designed and/or arranged that, when the cover is pressed on to the container, they yield resiliently in the region of their contact with the said bead and, after passing over the bead, spring back. The indentation or that portion of it which has passed over the bead acts as a detent or stop to hold the cover on the container. The novel cover is preferably made of a material having sufficient resiliency to spring back after the detents have passed over the bead such as tinned or chromed steel sheet.

A cover according to the invention may be used, for example, in conjunction with conventional glass beaker-shaped containers with unground edges. For technical production reasons, these usually exhibit a scarcely perceptible edge-bead, which however is sufficient to hold a cover constructed according to the invention. Any out-of-roundness of the edge-bead which must be expected with containers of this kind, is not detrimental, since it is compensated for automatically by the resiliency of the cover. The same applies to any obliqueness or other irregularity in the plane of the mouth of the container.

One example of application of the object of the invention is to cover glasses packed cold with mustard or similar material. In this application the vacuum may be produced by using steam in a manner to be described. A particularly advantageous method of producing a vacuum closure for containers, using covers constructed according to the invention, and with the aid of a conveyor mechanism moving the filled containers continuously or intermittently, consists in feeding a cover from a storage container down a slope to a filled container and placing it initially in an oblique position on one side of the mouth of the container. A jet of steam is then blown under the cover and into the container for a short time from a nozzle. The container is then carried past a stationary stop which presses the cover on. The steam cools and condenses and a negative pressure of, for example, 0.4 atm. is obtained in the container causing the cover to seal it vacuum-tight. The seal can be easily released by rotating the cover manually with respect to the container so that pressure equalization takes place and the cover can easily be removed.

The invention is explained hereinafter in greater detail, and by way of example, with the aid of the drawing, wherein:

FIGURES 1, 1a and 2 show, in part and in section, two embodiments of a cover constructed according to the invention and fitted to a beaker-shaped glass container;

FIGURE 3 shows a cover of the type illustrated in FIGURE 1 seen in plan view from below;

FIGURE 4 illustrates a manner of vacuum closing containers with covers constructed according to the invention.

In the embodiment shown in FIGURES 1, 1a and 3 the cover 1, having an annular sealing insert 5, is used with a glass-beaker shaped container having an edge-bead 4.

Cover 1, which in FIGURE 3 may be seen in plan view from below, exhibits a number, for example five to ten, of rib-shaped indentations 6 located around the periphery of the cover. Indentations of this kind have the advantage that they may be produced simultaneously with the cover, in the drawing process used to produce the said cover, in a relatively simple manner. FIGURE 1a shows the cover per se.

Circle 6' shown in FIGURE 3 in dotted lines and touching indentations 6 is somewhat smaller in diameter than the outer periphery of edge-bead 4 of the container. The indentations 6 in the side wall of the cover are so arranged and designed that, when the cover is pressed on to the container, they initially yield resiliently in the region of contact 7 with the edge-bead of the container and then, after passing over the said bead, they hold the cover to the container after the manner of a stop by virtue of their return movement. The rib-shaped indentations 6 preferably have an approximately arc-shaped profile; this profile, and the rib configuration, promotes the resilient quality of the said indentations. As may be seen in FIGURE 1, the ribs cross the edge-bead of the container when the cover is in the closed position on the said container. At the points where they are in contact with the bead they remain deformed, whereas in the area between the crossings and flange of the side wall of the cover, which area has passed over the bead, they re-assume their original shape by reason of their resiliency.

In the embodiment shown in FIGURE 2, a cover 2 having a sealing insert 5 and indentations 8 is mounted on a beaker-shaped container 3 having a bead 4 on the edge of its opening. The indentations 8 in the side wall of the cover are spaced from the surface of the cover which bears on the container edge in such a manner that when the cover is in the closed position on the container, they are positioned below the bead. Apart from this, their function is basically the same as in the embodiment in FIGURE 1.

FIGURE 4 illustrates schematically a method of continuously vacuum closing containers, using the new snap-on cover. The filled containers 10, 10', 10" are carrried on a conveyor mechanism 11 moving intermittently or continuously. At a given moment a cover 12 is fed slidingly to a container down a sloping path 14 from a storage stack 13, and is placed on the container opening initially on one side in an oblique position. A jet of steam is then blown for a short time under the cover onto the container. The container is then moved onwards past a stationary, or, if necessary, a sprung stop 16 which presses the cover on the container with the indentations passing over the beaded edge.

The design and application possibilities of the invention are not restricted to the examples individually described and illustrated herein. Thus the new cover may also be used for marmelade or other preserves, where the vacuum is produced by a hot-water or a steam bath.

It is particularly advantageous if the ribs, which begin in the plane of the cover top and preferably end before the flanged edge of the side wall of the cover, as in the design in FIGURES 1, 1a and 3 which illustrates the preferred form of embodiment, are made as short as possible, so that when the cover is pressed on to the container, they end shortly below the point where they cross the container bead, since it has been found that the desired elasticity and stiffness of the part of the rib coming to rest below the intersection of the bead and rib then becomes particularly apparent by reason of the configuration of the rib and rib end, and a particularly high restoring force is produced.

The embodiments of the invention in which an exclusive property or privilege is claimed are defined as follows:

1. A device for use in effecting a vacuum closure comprising a beaker-like container having a small outwardly projecting bead located at the mouth of the container, a cap-shaped cover comprising a cover plate arranged to extend across the mouth of the container, a sealing insert positioned at the periphery of the cover plate and arranged to cooperate with the bead in forming a seal for said container, a side wall extending completely around and depending from the periphery of said cover plate, wherein the improvement comprises a plurality of resilient angularly spaced inward directed indentations formed in the side walls of the cover, said indentations having a radially inwardly directed elongated rib-like configuration extending from the intersection of said cover plate and said side wall toward the free end of said side wall for a dimension sufficient for the ends of said indentations remote from the cover plate to extend beyond said bead on said container in its assembled position thereon, said indentations having an arcuate shape in a plane parallel to said cover plate of said cover, the radially innermost surfaces of said indentations for the extent thereof from said cover plate to the end remote from said cover plate being disposed on the periphery of an imaginary circle having a diameter less than the outer diameter of the bead and being disposed in a plane parallel to the plane of the cover plate, and in the assembled position of said cover on said container the inner surfaces of said indentations deflect outwardly in passing over the bead on the container and the ends of said indentations remote from said cover plate extend below said bead and return to their normal undeflected position and the intermediate portions of said indentations between their ends are deflected outwardly by contact with said bead for forming a locking action between said bead and said indentations for holding said cover on said container.

2. A device, as set forth in claim 1, wherein said cover is formed of one of tinned or chromed steel sheet.

References Cited

UNITED STATES PATENTS

| 2,241,588 | 5/1941 | Enkur | 215—38 |
| 2,369,762 | 2/1945 | Stewart et al. | 53—110 |
| 2,901,140 | 8/1959 | Robinson | 215—41 |
| 3,152,711 | 10/1964 | Mumford et al. | 215—38 |
| 3,380,225 | 4/1968 | Ochs et al. | 53—110 |

WILLIAM T. DIXSON, JR., Primary Examiner

U.S. Cl. X.R.

220—60